Sept. 7, 1937. K. M. YOST 2,092,236
BRAKE
Filed Oct. 28, 1935 6 Sheets-Sheet 1

INVENTOR.
KARL M. YOST.
BY
ATTORNEY.

Sept. 7, 1937.　　　　　　K. M. YOST　　　　　　2,092,236
BRAKE
Filed Oct. 28, 1935　　　　6 Sheets-Sheet 2

INVENTOR.
KARL M. YOST
BY
ATTORNEY.

Sept. 7, 1937.   K. M. YOST   2,092,236
BRAKE
Filed Oct. 28, 1935   6 Sheets-Sheet 3

INVENTOR.
KARL M. YOST.
BY
ATTORNEY.

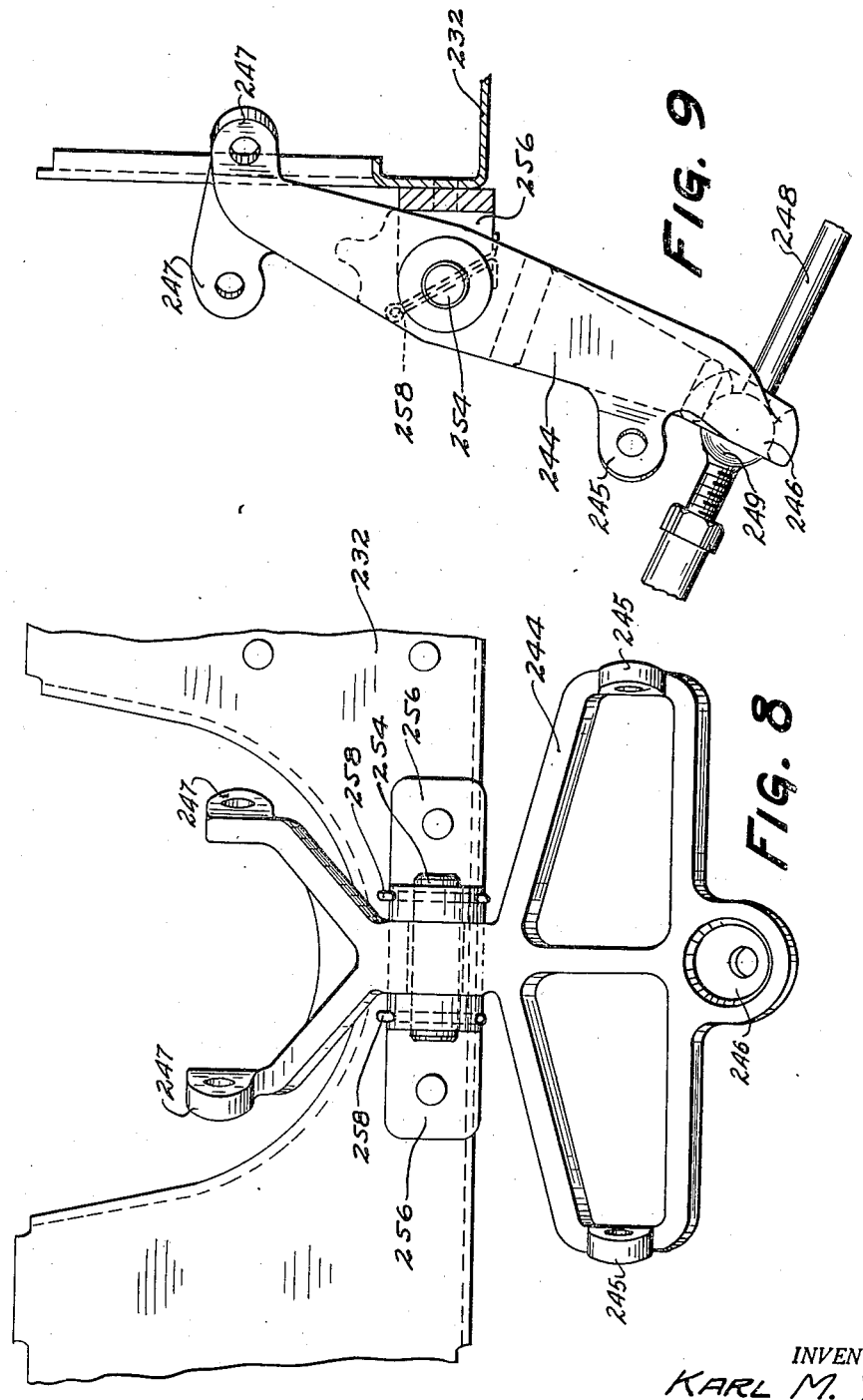

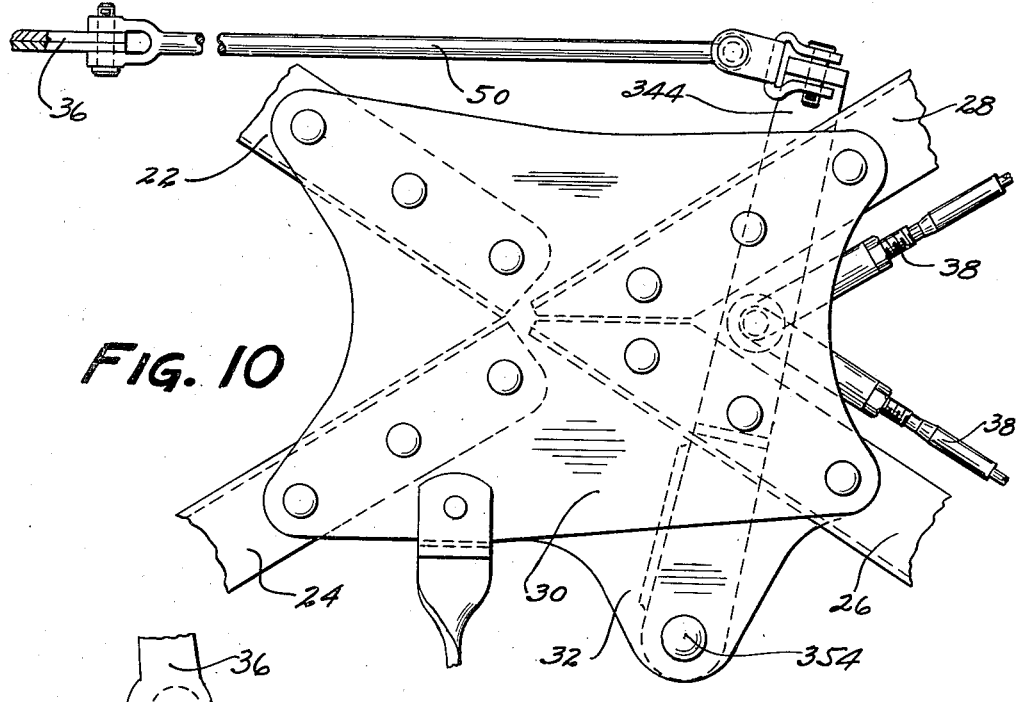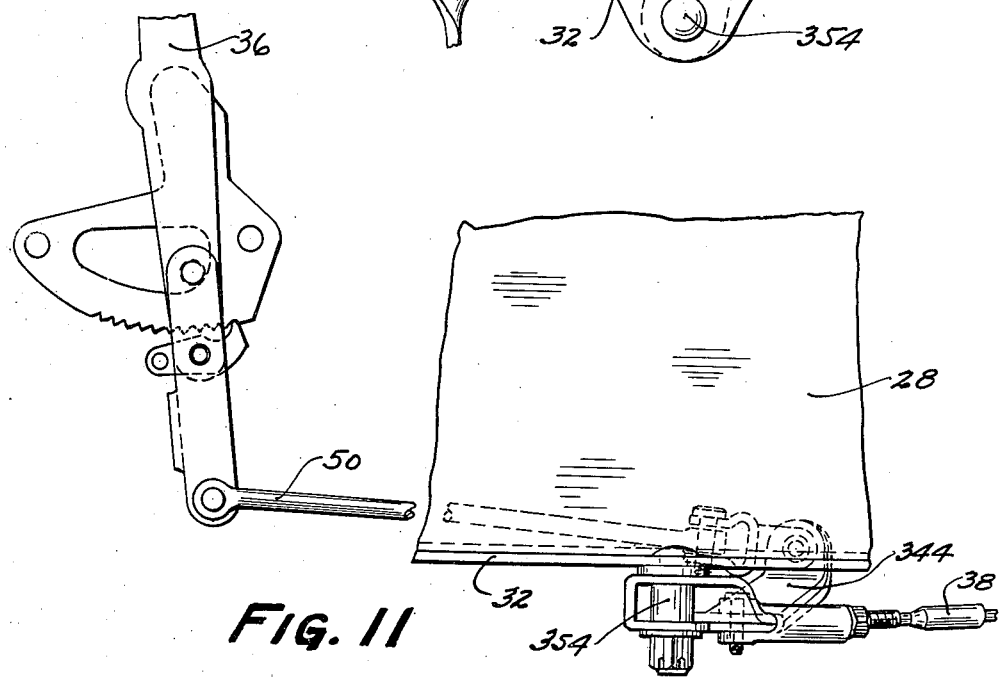

Sept. 7, 1937.  K. M. YOST  2,092,236
BRAKE
Filed Oct. 28, 1935  6 Sheets-Sheet 6

INVENTOR.
KARL M. YOST.
BY
ATTORNEY.

Patented Sept. 7, 1937

2,092,236

UNITED STATES PATENT OFFICE 2,092,236

BRAKE

Karl M. Yost, South Bend, Ind., assignor to Bendix Products Corporation, South Bend, Ind., a corporation of Indiana Application October 28, 1935, Serial No. 46,998

8 Claims. (Cl. 188—10)

This invention relates to brakes, and has for a main object the simplification of the operating connections of a system of four-wheel automobile brakes.

The novel connections herein disclosed are intended for use in an automobile having a rigid frame connected by inclined members arranged in X form, and which are connected at their outer ends to the side frame members and which have their inner ends rigidly connected in the center line of the vehicle by means such as upper and lower plates permanently secured thereto.

In lieu of the usual expensive shaft operators, I support movably on the lower plate of the above-described frame means, such as a lever or slide, which is operatively connected to a foot pedal or other operating lever arranged forwardly thereof, and which has means connecting it to a plurality of brakes and which is moved fore and aft in the angle between two of said inclined members, in a plane below said lower plate.

The lever carried by the lower plate may be a compound lever swinging fore and aft on a stationary pivot carried by a bearing or the like on the lower plate, and preferably also supported and secured at its ends, and I prefer to form the lever with parts on opposite sides of the bearing, so that the lever is still operative even if the shaft breaks in two.

The above and other objects and features of the invention, including various novel combinations of parts and desirable particular constructions, will be apparent from the following description of the illustrative embodiments shown in the accompanying drawings, in which:

Figure 8 is a front elevation of a different form of compound lever, with its mounting;

Figure 9 is a side elevation thereof;

Figure 10 is a top plan view corresponding to Figure 2, but illustrating a horizontal lever;

Figure 11 is a partial side elevation of the mechanism of Figure 10;

Figure 1:
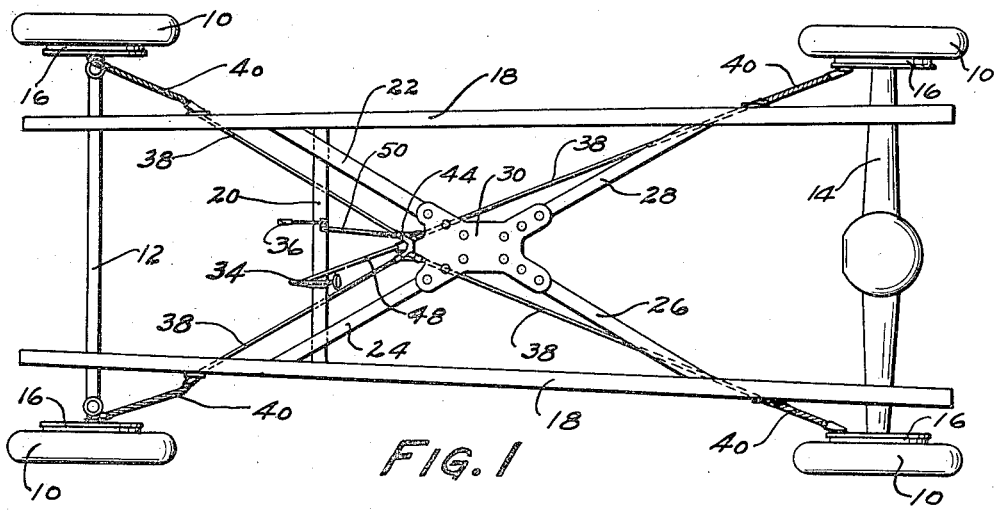
Figure 1 is a top plan view of an automobile chassis embodying one form of my invention.

The vehicle illustrated in Figure 1 includes road wheels 10 on axles 12 and 14 provided with brakes 16 and supporting, through the usual springs (not shown), a chassis frame including side members 18. The side members 18 are connected by suitable cross members 20, only one of which is illustrated herein, and by four inclined members 22, 24, 26, and 28 arranged in X form.

Figure 3:
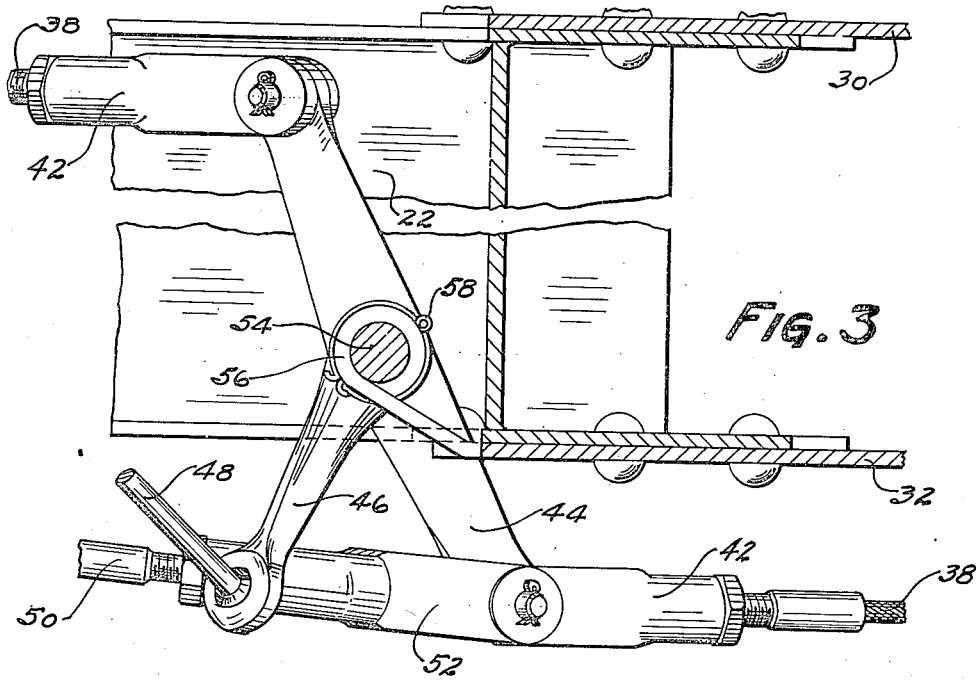
Figure 3 is a partial vertical section on the line 3—3 of Figure 2.

These inclined members are riveted or otherwise connected at their outer ends to the side members 18, and their inner ends are permanently connected, at the center line of the vehicle, by means such as upper and lower plates 30 and 32 permanently riveted or otherwise secured thereto (see Figure 3).

The brakes are intended to be applied by mechanical means, preferably alternatively by either of two operating levers shown as a foot pedal 34 and a hand lever 36, through a novel compound lever or the like described below, acting on cables or other connections 38 generally paralleling the inclined frame members and operatively connected at their outer ends to the brakes.

In Figures 10 to 13 the above-described connections extend from the hand lever 36 to the rear brakes only, the service connections in these embodiments being hydraulic, and not illustrated.

The portions of the cables 38 between the side frame members 18 and the brakes 16 are shown as slidably inclosed in flexible Bowden conduits 40, each secured at its inner end to one of the frame members 18 and at its outer end to the corresponding brake backing plate.

Figure 2:
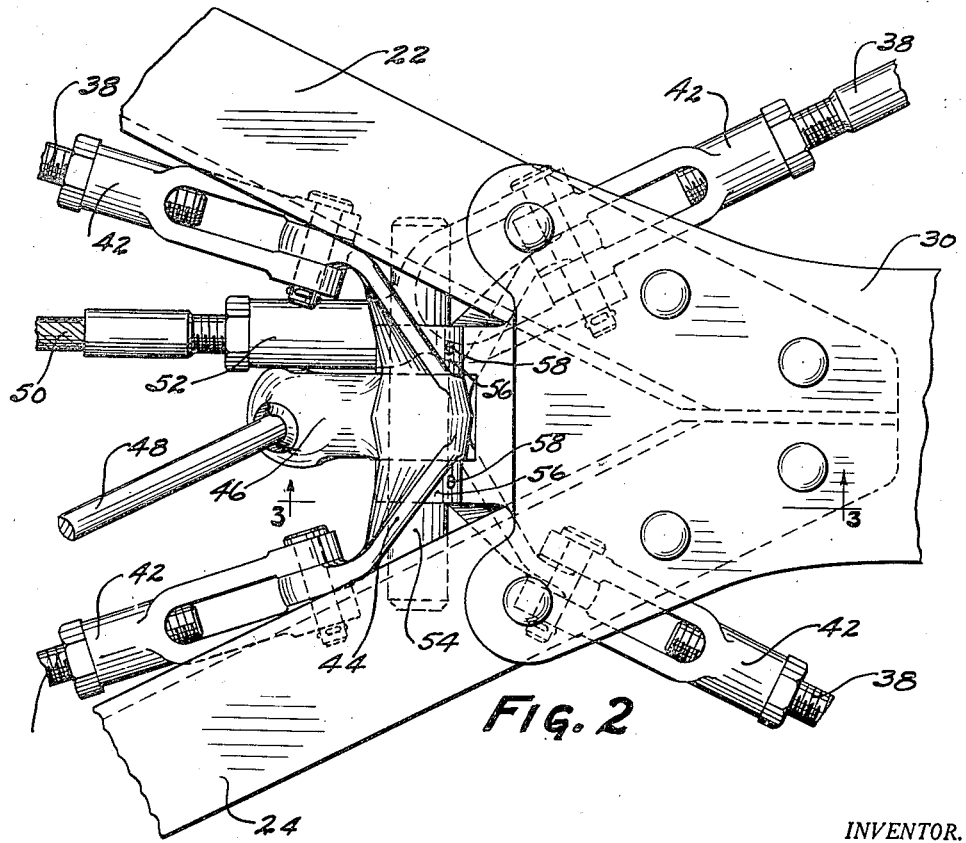
Figure 2 is an enlarged view, in top plan, of the compound lever of Figure 1, with its associated parts.

In the embodiment of Figures 1, 2, and 3, the cables 38 have at their inner ends adjustable clevises 42 pivoted to four arms formed as integral extensions of a forged compound lever 44, which also has an arm 46 provided with a semispherical socket receiving the ball end of a connection 48 from the pedal 34. The hand lever 36 is shown provided with a connection 50 having at its rear end an adjustable clevis 52 pivotally secured to the same arm of the lever 44 as the cable 38 for the right rear brake.

The lever 44 is arranged to swing in a vertical plane fore and aft, in the angle between the inclined members 22 and 24 just behind the pedal 34 and hand lever 36, with the connections 36 to the rear brakes arranged in a plane just below the lower plate 32. The lever is fulcrumed on a transverse horizontal pivot 54 sleeved in two bearings 56 integral with the front end of the lower plate 32 and spaced apart to receive between them a hub formed as an extension of the arm 46. The pivot 54 may be held against turning by means such as two cotter pins 58 pinning it to the bearings 56.

The connections 48 and 50 are preferably flexible cables, so that the pedal and hand lever can be operated independently, but if it is desired to use rods they may be provided with suitable one-way connecting devices of any desired character.

Figure 4:
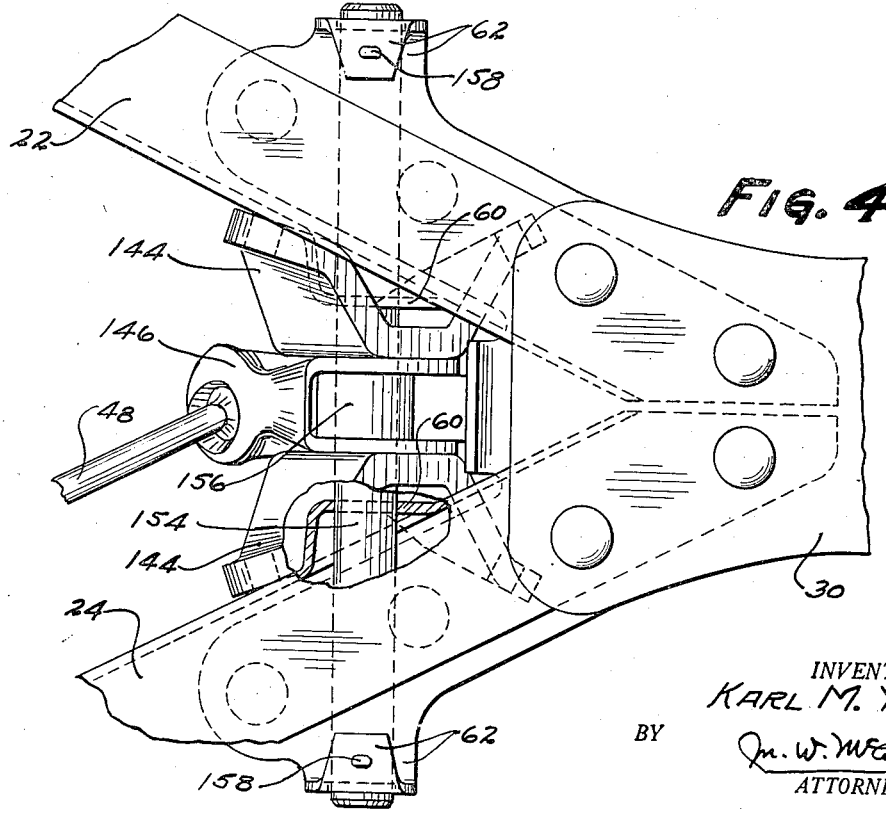
Figure 4 is a top plan view corresponding to Figure 2, but showing a compound lever built up from steel stampings.

The embodiment of Figure 4 includes a compound lever built up by welding or otherwise securing together two end lever stampings 144 and a central channel-section stamped lever arm 146. This forms a composite assembly which has two spaced parts, each consisting of one of the stampings 144 and one wall of the arm 146, journaled on a relatively long transverse horizontal pivot 154.

The pivot 154 is supported at its center by a bearing 156 formed as an integral forwardly-projecting extension of the bottom plate 32, and on opposite sides of the compound lever it is supported in aligned openings in bracket portions 60 pressed from the inclined members 22 and 24. At its ends the pivot 154 passes through openings in bent tongues 62 formed as extensions of the bottom plate 32, and it is held by cotter pins 158 extending through the tongues 62.

Figure 5:
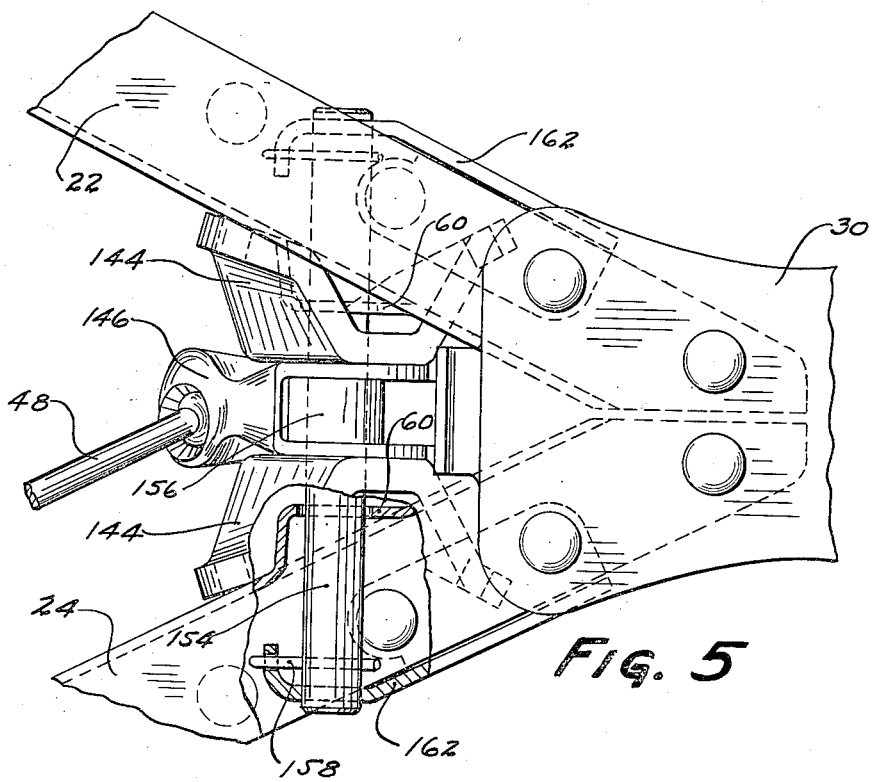
Figure 5 is another modification, shown in top plan in a view corresponding to Figures 2 and 4.
Figures 6, 7:
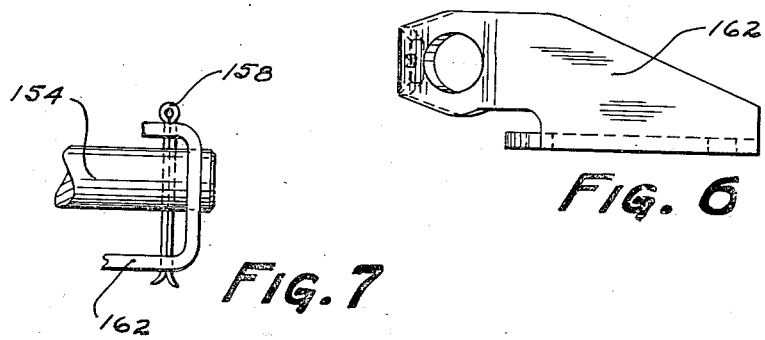
Figure 6 is a side elevation of one of the parts securing the ends of the horizontal pivot for the compound lever in Figure 5.
Figure 7 is a top plan view of one end of the pivot, showing the means for securing it.

The arrangement shown in Figures 5, 6, and 7 differs from that of Figure 4 in that the ends of the pivot 154 are held by separately-formed brackets 162 which are riveted or otherwise secured to the plate 32. In this modification, the openings in the bracket portions 60 are shown large enough to give a substantial clearance around the pivot 154, to facilitate assembly, while at the same time they serve as safety bearings which become effective if one of the brackets 162 is broken.

Figures 8 and 9 show a one-piece compound lever 244 fulcrumed on the pivot 254 carried on frame brackets 256 bolted to a plate 232, and corresponding to the pivot 54. The pivot 254 may be secured to the brackets 256 by means such as cotter pins 258. The lever 244 includes upper and lower sets of lugs 245 and 247 connected to the cables 38 for the rear and front brakes, as well as a lug 246 having a socket for a ball 249 on the pedal rod 248. The connection 50 may be connected to one of the lugs 245, the same as it is connected to the arm for the right rear brake in Figure 3.

Figures 10 and 11 show means for operating the two rear brakes mechanically from the hand lever 36, for use when the foot pedal operates the four brakes hydraulically. In this embodiment, the connection 50 from the hand lever is pivoted to one end of a horizontal transverse lever 344 pivoted at 354 at its other end on an extension of plate 32, and which swings horizontally fore and aft in a plane below the lower plate 32. The central part of the lever has a connection to cables 38 of the rear brakes, which connection moves fore and aft in the angle between inclined members 26 and 28.

Figure 12:
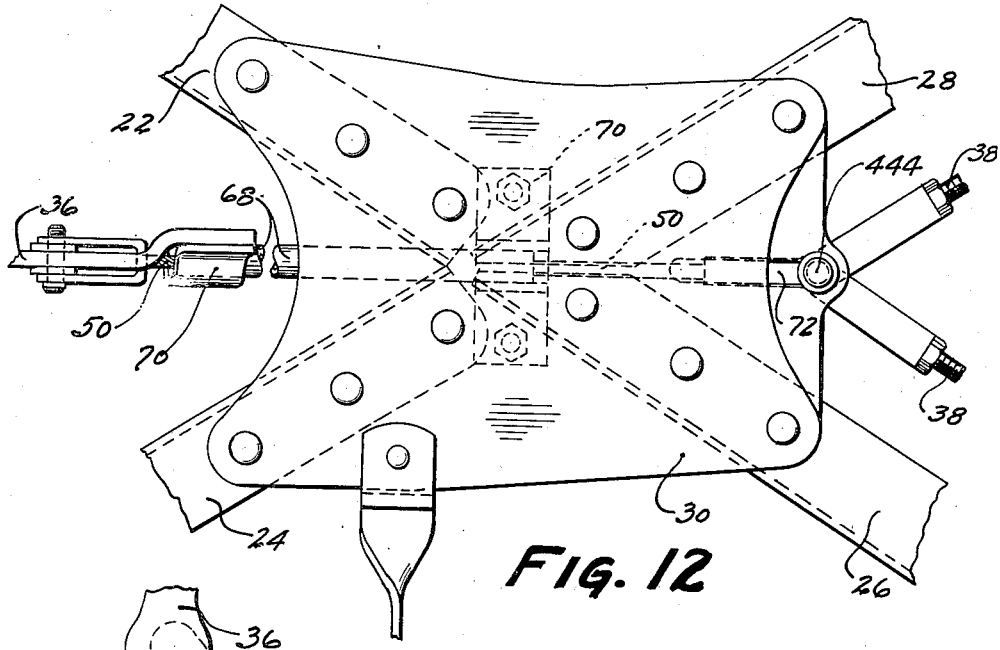
Figure 12 is a top plan view corresponding to Figure 2, but illustrating the use of a horizontal slide.
Figure 13:
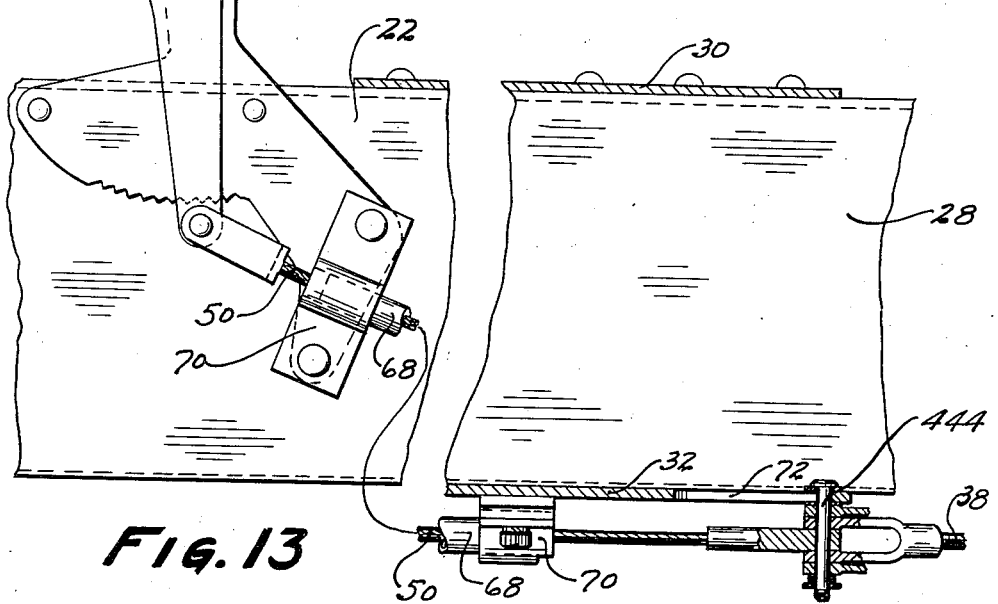
Figure 13 is a side view thereof, partly in elevation and partly in vertical section.

In Figures 12 and 13 the cable 50 extends through a Bowden conduit 68 fixed at its ends in suitable brackets 70, the rear one of which is secured to the bottom face of plate 32. The cable 50 is connected to a horizontal slide such as a headed pin 444, connected to the cables 38 of the rear brakes. The plate 32 is slotted at 72 to receive and support the guide pin or slide 444.

While several different embodiments have been described in detail, it is not my intention to limit the scope of the invention to those particular embodiments, or otherwise than by the terms of the appended claims.

I claim:

1. A vehicle comprising a frame including side members rigidly connected by inclined members arranged in X form and connected at their outer ends to the side members and which have their inner ends rigidly connected by top and bottom plates permanently secured thereto, wheels supporting said frame and which are provided with brakes, and operating connections for said brakes including a compound lever connected to a plurality of brakes and to an operating lever, a transverse horizontal pivot carried by one of said plates and oscillatably supporting said compound lever, said compound lever being arranged in the angle between two of said inclined members to swing fore and aft of the vehicle, and means for securing the ends of said pivot to one of said plates to prevent its oscilllation.

2. A vehicle comprising a frame including side members rigidly connected by inclined members arranged in X form and connected at their outer ends to the side members and which have their inner ends rigidly connected by top and bottom plates permanently secured thereto, wheels supporting said frame and which are provided with brakes, and operating connections for said brakes including a lever connected to an operating lever, and a pivot for said lever carried by the lower one of said plates, said lever having a connection to a plurality of brakes arranged in the angle between two of said inclined members to swing fore and aft of the vehicle below the plane of the lower plate.

3. A vehicle comprising a frame including side members rigidly connected by inclined members arranged in X form and connected at their outer ends to the side members and which have their inner ends rigidly connected at the center line of the vehicle by upper and lower plates rigidly secured thereto, wheels supporting said frame and which are provided with brakes, an operating lever mounted forwardly of said plates, and means movably mounted on the lower one of said plates and which is operably connected to the operating lever and which has means connecting it to a plurality of said brakes and which connecting means is movable in the angle between two of said inclined members fore and aft of the vehicle below the plane of said lower plate.

4. A vehicle comprising a frame including side members rigidly connected by inclined members arranged in X form and connected at their outer ends to the side members and which have their inner ends rigidly connected at the center line of the vehicle by upper and lower plates rigidly secured thereto, wheels supporting said frame and which are provided with brakes, an operating lever mounted forwardly of said plates, and a slide horizontally movably mounted on the lower one of said plates and which is operably connected to the operating lever and which has means connecting it to a plurality of said brakes and which connecting means is movable in the angle between two of said inclined members fore and aft of the vehicle below the plane of said lower plate.

5. A vehicle comprising a frame including side members rigidly connected by inclined members arranged in X form and connected at their outer ends to the side members and which have their inner ends rigidly connected at the center line of the vehicle by upper and lower plates rigidly secured thereto, wheels supporting said frame and which are provided with brakes, an operating lever mounted forwardly of said plates, and a horizontal lever movably mounted on the lower one of said plates and which is operably connected to the operating lever and which has means connecting it to a plurality of said brakes and which connecting means is movable in the angle between two of said inclined members fore and aft of the vehicle below the plane of said lower plate.

6. A vehicle comprising a frame including side members rigidly connected by inclined members arranged in X form and connected at their outer ends to the side members and which have their inner ends rigidly connected at the center line of the vehicle by upper and lower plates rigidly secured thereto, wheels supporting said frame and which are provided with brakes, an operating lever mounted forwardly of said plates, a horizontal transverse pivot carried by a bearing formed at the central front portion of the bottom plate in the angle between the two front members and secured also at its ends to one of said plates, and a compound lever having parts oscillatably mounted on said pivot on opposite sides of said bearing and which is connected to said operating lever and to said brakes.

7. A vehicle comprising a frame including side members rigidly connected by inclined members arranged in X form and connected at their outer ends to the side members and which have their inner ends rigidly connected at the center line of the vehicle by upper and lower plates rigidly secured thereto, wheels supporting said frame and which are provided with brakes, an operating lever mounted forwardly of said plates, a horizontal transverse pivot carried by the bottom plate in the angle between the two front members, and a compound lever oscillatably mounted on said pivot and which is connected to said operating lever and to said brakes.

8. A vehicle comprising a frame including side members rigidly connected by inclined members arranged in X form and connected at their outer ends to the side members and which have their inner ends rigidly connected at the center line of the vehicle by upper and lower plates rigidly secured thereto, wheels supporting said frame and which are provided with brakes, an operating lever mounted forwardly of said plates, a horizontal transverse pivot carried by the bottom plate in the angle between the two front members, and a compound lever oscillatably mounted on said pivot and which is connected to said operating lever and to said brakes, together with an emergency operator connected to a different part of said compound lever from said operating lever.

KARL M. YOST.